(12) United States Patent
Greene et al.

(10) Patent No.: US 10,060,587 B2
(45) Date of Patent: Aug. 28, 2018

(54) FIBER OPTIC LIGHTING DEVICE WITH PLURAL LIGHT INPUTS

(71) Applicant: Valeo North America, Inc., Troy, MI (US)

(72) Inventors: Kayla Greene, Seymour, IN (US); John Orisich, Seymour, IN (US); Brant Potter, Seymour, IN (US); P. Davis Baker, Seymour, IN (US)

(73) Assignee: VALEO NORTH AMERICA, INC., Troy, MI (US)

( * ) Notice: Subject to any disclaimer, the term of this patent is extended or adjusted under 35 U.S.C. 154(b) by 0 days.

(21) Appl. No.: 15/282,506

(22) Filed: Sep. 30, 2016

(65) Prior Publication Data

US 2018/0094790 A1 Apr. 5, 2018

(51) Int. Cl.
| | | |
|---|---|---|
| *F21V 9/00* | (2018.01) | |
| *F21S 41/24* | (2018.01) | |
| *F21S 8/10* | (2006.01) | |
| *B60Q 1/30* | (2006.01) | |
| *B60Q 1/44* | (2006.01) | |
| *H05B 37/02* | (2006.01) | |
| *B60Q 1/08* | (2006.01) | |
| *H05B 33/08* | (2006.01) | |
| *F21S 43/237* | (2018.01) | |

(Continued)

(52) U.S. Cl.
CPC ............... *F21S 41/24* (2018.01); *B60Q 1/08* (2013.01); *B60Q 1/30* (2013.01); *B60Q 1/44* (2013.01); *F21S 41/141* (2018.01); *F21S 43/14* (2018.01); *F21S 43/237* (2018.01); *F21S 48/115* (2013.01); *F21S 48/1241* (2013.01); *F21S 48/215* (2013.01); *F21S 48/2237* (2013.01); *H05B 33/0851* (2013.01); *H05B 37/0227* (2013.01); *F21Y 2115/10* (2016.08)

(58) Field of Classification Search
USPC .......................................... 362/511, 512, 514
See application file for complete search history.

(56) References Cited

U.S. PATENT DOCUMENTS

| 4,234,907 A | 11/1980 | Daniel |
| 4,977,487 A | 12/1990 | Okano |

(Continued)

FOREIGN PATENT DOCUMENTS

| DE | 10 2004 016 130 A1 | 10/2005 |
| DE | 10 2008 034 791 A1 | 1/2010 |

(Continued)

OTHER PUBLICATIONS

Search Report and Written Opinion dated Mar. 2, 2016 in PCT/US2015/036629, filed Jun. 19, 2015.

*Primary Examiner* — Vip Patel
(74) *Attorney, Agent, or Firm* — Oblon, McClelland, Maier & Neustadt, L.L.P.

(57) ABSTRACT

In one embodiment, a lighting device for a vehicle includes a first light source configured to generate first light, and a second light source configured to generate second light. A fiber optic light panel is optically coupled to the first and second light sources and includes a plurality of optical fibers each configured to emit light along a respective length of the optical fiber. The plurality of optical fibers are arranged to define an illumination region such that the first and second light is output from the illumination region.

20 Claims, 15 Drawing Sheets

(51) Int. Cl.
*F21S 41/141* (2018.01)
*F21S 43/14* (2018.01)
*F21Y 115/10* (2016.01)

(56) References Cited

U.S. PATENT DOCUMENTS

| | | |
|---|---|---|
| 6,305,813 B1 | 10/2001 | Lekson et al. |
| 2003/0210537 A1* | 11/2003 | Engelmann .......... G02B 6/0018 362/23.15 |
| 2008/0025039 A1 | 1/2008 | Guillermo |
| 2009/0161378 A1 | 6/2009 | Enz |

FOREIGN PATENT DOCUMENTS

| | | |
|---|---|---|
| DE | 10 2012 109 422 A1 | 4/2014 |
| DE | 20 2013 105 597 U1 | 5/2014 |
| EP | 0 359 450 | 3/1990 |
| FR | 2 997 354 | 5/2014 |

* cited by examiner

FIBER OPTIC LIGHTING DEVICE WITH PLURAL LIGHT INPUTS

FIELD OF THE INVENTION

This invention relates to lighting systems, and more particularly to a lighting and/or signaling device that utilizes fiber optic light panels.

BACKGROUND OF THE INVENTION

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Aesthetic lighting effects lead to an even greater number of components and complexity. Such vehicle lighting devices are not easily adapted to the styling of the vehicle.

In recent years some vehicle manufacturers are utilizing organic light-emitting, diodes (OLED) in an effort to meet desired lighting and aesthetic characteristics of vehicle lighting. OLED devices generally take the form of very thin panels that can be formed into three-dimensional shapes. Fiber panel LEDs may have a similar panel form to OLEDs. For example, U.S. Pat. No. 6,874,925 discloses fiber optic light emitting panel assemblies. However, these assemblies have generally been limited to LCD backlighting, surgical devices, phototherapy and other applications not subject to the technical requirements of vehicle lighting.

SUMMARY OF THE INVENTION

It is one object of the invention to provide a fiber optic light panel device that can meet the technical and aesthetic requirements for vehicle lighting.

Another object of the invention is to provide a fiber optic light panel device that can conform to the styling of a vehicle.

Yet another object of the invention is to provide fiber optic vehicle light panel having a plurality of light sources.

Still another aspect of the invention is to provide a fiber optic light panel having spatial lighting effects.

These and/or other objects may be provided by embodiments of the invention disclosed herein.

In one embodiment, a lighting device for a vehicle includes a first light source configured to generate first light, and a second light source configured to generate second light. A fiber optic light panel is optically coupled to the first and second light sources and includes a plurality of optical fibers each configured to emit light along a respective length of the optical fiber. The plurality of optical fibers are arranged to define an illumination region such that the first and second light is output from the illumination region. The first and second light sources may be connected to opposing ends of each of the plurality of optical fibers, and the first and second light sources can be configured to generate the same or different types of light.

In some embodiments of the lighting device the plurality of optical fibers are positioned side-by-side in a same plane and alternatingly coupled to the first and second light sources respectively. The plurality of optical fibers may be individually alternatingly coupled to the first and second light sources respectively, or may include multiple groups of adjacently arranged fibers, and the said multiple groups are alternatingly coupled to the first and second light sources.

In certain embodiments, of the lighting device the plurality of optical fibers are provided in a single integral lighting panel. In other embodiments, the plurality of optical fibers are provided in respective sub-panels arranged side-by-side and/or at least partially overlapping one another.

The plurality of optical fibers can include first optical fibers that receive the first light from a first side of the illumination region, and second optical fibers that receive the second light from a second side of the illumination region such that the first and second lights travel in different directions in said illumination region. The plurality of optical fibers can each receive light from a same side of the illumination region such that the first and second lights travel in a same direction in said illumination region.

In some embodiments, the lighting device includes a controller configured to control the first and second light sources to achieve different light output characteristics from the panel. The controller may be configured to control the first and second light sources to achieve at least one of spatial effects and dynamic effects of light output in the illumination region.

Another aspect of the invention relates to a method for operating a fiber optic light panel having a plurality of optical fibers configured to emit light along a respective length of the optical fiber and the plurality of optical fibers are arranged to define an illumination region. The method includes coupling first light to at least one of the plurality of optical fibers of the panel, and coupling second light to at least another of the optical fibers of the panel. Timing of the coupling of the first and second light is controlled to provide different light output characteristics from the illumination region for different automotive lighting functions. The different light output characteristics can include different colors suitable for the different automotive lighting functions respectively, or different brightness outputs suitable for the different automotive lighting functions respectively. Timing of the coupling of the first and second light can be controlled to provide dynamic lighting effects from the panel.

Still another aspect of the invention includes a fiber optic lighting panel having a fiber portion including a plurality of optical fibers each configured to emit light along a respective length of the optical fiber, and the plurality of optical fibers are arranged to define an illumination region of the panel. An optical reflective portion is provided on a first side of the fiber portion. A light transmission portion is provided on a second side of the fiber portion which is opposite to said first side. At least one of the fiber portion, optical reflective portion and transmission portion is configured to produce spatial variation in a light output characteristic emitted from said :light emitting region. At least one of the fiber portion, optical reflective portion and transmission portion has a physical property which is changed over an area of the light emitting region.

BRIEF DESCRIPTION OF THE DRAWINGS

In the Drawings:

FIG. 7 shows overlapping lighting panels having optical entries on a same side in accordance with an embodiment of the invention;

DETAILED DESCRIPTION OF SEVERAL EMBODIMENTS

Fiber optic light panels have previously been used in backlighting liquid crystal displays and electronic controls, as well as phototherapy devices. Patent application serial no. PCT/US2015/036629 (unpublished) titled Fiber Optic Lighting And/or Signaling System for a Vehicle, filed on Jun. 19, 2015 by the same Applicant as the present application, discloses a fiber optic light panel device for exterior lighting of vehicles. The entire contents of this application are incorporated herein by reference.

A fiber optic light panel assembly generally includes a light source that inputs light to a fiber bundle having fibers extending therefrom to form a light panel. U.S. Pat. No. 7,305,163 discloses a phototherapy device which provides multiple light sources to a fiber optic light panel to increase light output therefrom. A photosensor is used to measure output from the light sources so that a constant light output can be maintained to achieve consistent clinical results. The present inventors have recognized, however, that the light panel assembly of this patent does not provide versatile lighting functionality such as dynamic lighting effects from the panel, which may be desirable for automotive lighting.

Figure 1:
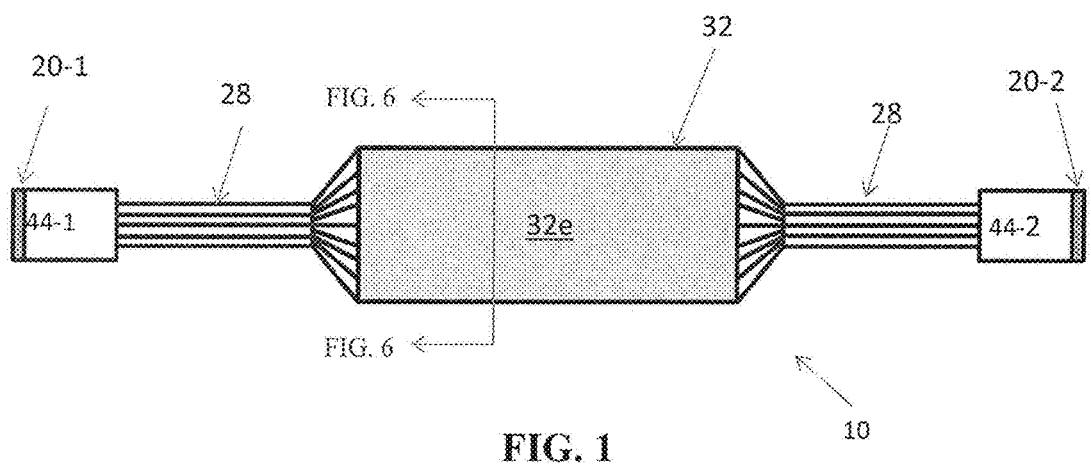
FIG. 1 is a schematic planar view of a fiber optic light panel device in accordance with embodiments of the invention.

FIG. 1 is a schematic representation of a lighting system in accordance with an embodiment of the invention. The lighting system 10 includes light sources 20-1, 20-2, fiber bundles 44-1, 44-2, and a fiber panel 32. The light sources 20-1, 20-2 generate first and second light respectively for coupling to the fiber panel 32, which emits light from a surface thereof to meet the desired vehicle lighting function. According to embodiments of the invention, the panel 32 includes a plurality of optical fibers 28 arranged to define an illumination region 32e of the panel such that the first and second light can be output from the illumination region 32e to perform one or more vehicle lighting functions. The fiber bundles 44-1, 44-2 group fibers 28 of the panel 32 in a configuration suitable for accepting light from respective sources 20-1 and 20-2 into the fiber panel 32.

The light sources 20-1, 20-2 may be any suitable source for generating light having radiation and/or photometric characteristics to provide a desired light output from panel 32. For example, the light sources may provide a ambition pattern or any other radiation pattern of suitable flux, wavelength and intensity to satisfy the lighting function or aesthetic lighting effects of the panel 32.

The light source 20 may include one or more light emitting devices or solid state light sources. The term "solid state" generally refers to light emitted by solid-state electroluminescence, as opposed to incandescent bulbs or fluorescent tubes. For example, the light source 20 may include a semiconductor light emitting diode (LED) or laser diode, an OLED, polymer light emitting diode (PLED), an LED lamp package, LED chip or LED die, or an array of one or more of these devices. Where a plurality of LEDs is used, they can be the same or different colors. It should be understood that the light source 20 could be multiple discrete LEDs or an LED light bar. A conventional printed circuit board (PCB) having one or more LEDs could be used with the optical fiber panel 32. In one example, the light source may be an LED providing a 2W, 140 lm output at 2.65 v. and 750 mA of current. Alternatively, 860 mA, 6,29 V, 510 lm white 1×2 LED source may be provided as light source 20. Halogen bulbs and/or an HID source may also be used.

Figure 2:
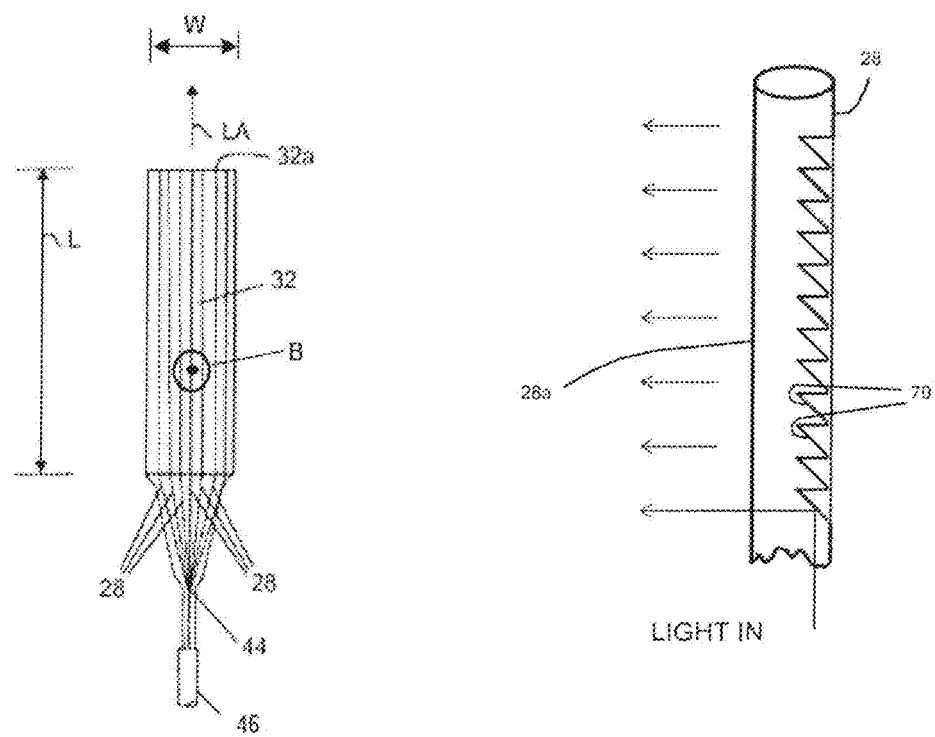
FIG. 2 is a planar view of a fiber optic light panel used in a lighting device according to embodiments of the invention.

FIG. 2 is a view of a fiber optic light panel used in a lighting system according to embodiments of the invention. The fiber optic light panel 32 includes a plurality of optical fibers 28 that extend along a length L of the panel 32, terminating at an end 32a of the panel. In the example of FIG. 2, the fibers 28 are arranged in an array along a width W such that they define a generally planar and generally rectangular panel 32 and generally rectangular illumination region 32e. The panel 32 and illumination region 32e may assume other arrangements and forms and is not limited to rectangularity and/or straight lines. For example, the panel 32 may have a width W that generally exceeds a length L. In example embodiments, the panel 32 is pliable and flexible, and may be adapted to be received in a support or frame which may define a three dimensional form of the light panel 32.

In the embodiment of FIG. 2, the plurality of optical fibers 28 are arranged in a generally parallel relationship with respect to each other and with respect to a longitudinal axis LA of the panel 32. However, it should be understood that the plurality of optical fibers 28 may assume similar or different positions (e.g., parallel, non-parallel, curved, arcuate or serpentine). For example, some of the plurality of optical fibers 28 may be straight while others are not. Further, although the plurality of optical fibers 28 are shown extending along the entire length L of the panel 32, respectively, some or all of the plurality of optical fibers 28 could extend less than the entire length. The plurality of optical fibers 28 could be longer than the length L and arranged, for example, in a circular, elliptical, polygonal or other pattern within the panel 32.

It should be understood that the panel 32 may include any number of fibers 28 depending on the environment in which they are going to be used. In some of the embodiments, there are approximately fifty (50) fibers of 0.23 mm diameter per panel 32 or 100 fibers per inch width (per layer). Obviously, these are just illustrations and other numbers and sizes of fibers 28 could be used. Also, the plurality of optical fibers 28 may have different sizes or dimensions, such as different diameters. Thus, the plurality of optical fibers 28 can be different shapes, dimensions and sizes and are adapted and arranged in the predetermined form depending on the light pattern or lighting function desired.

A conventional optical fiber generally transmits light through total internal reflection (TIR) from an input end to an output end of the fiber. According to embodiments of the invention, the fibers 28 of the optical light panel system 10 are configured and/or arranged such that light is emitted along a length of the fibers 28 making the panel 32 illuminate in a direction that is generally not parallel with a longitudinal axis LA of the fiber, as shown by point B in FIG. 2, which represents light rays coming out of the plane of the page.

Figure 3:
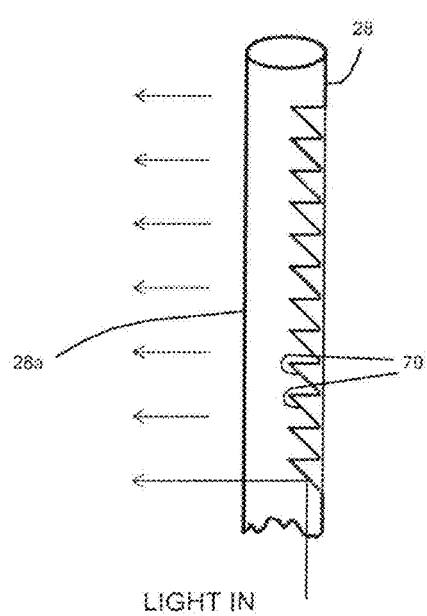
FIG. 3 is a schematic view of an optical fiber adapted to emit light along a length of the optical fiber.

FIG. 3 is a schematic view of an optical fiber adapted to emit light along a length of the optical fiber. To facilitate the light being emitted generally transverse to a longitudinal axis of the fiber 28, the fiber 28 may be modified to include optics such as a plurality of facets or reflective surfaces 70 which direct or reflect the light through a surface 28a of the fiber 28. Altering the fibers 28 to direct light in the desired direction can be achieved through a variety of methods including, but not limited to: providing the plurality of facets or reflective surfaces 70 as mentioned, laser ablating a surface of the fiber 28, mechanical abrasion of a surface of each fiber 28, etc. Further, depth, density and type of the alterations may be varied along the length of the fiber achieve different light output effects along the fiber 28. For example, spacing between reflective surfaces 70 may be varied in different portions of the fiber to achieve more or less light intensity at the surface 28a of the fiber. As another example, a density or degree of mechanical abrasion may be graded along the fiber to achieve spatially resolved intensity output along the fiber 28.

Figure 4:
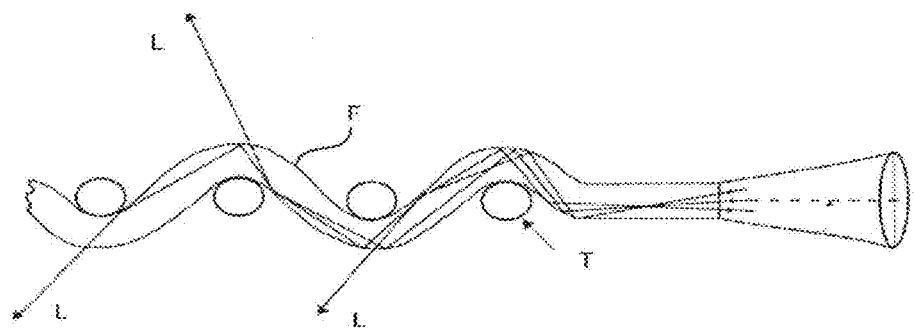
FIG. 4 is a schematic view of another optical fiber adapted to emit light along a length of the optical fiber.

FIG. 4 is a schematic view of another optical fiber adapted to emit light along a length of the optical fiber. It has been found that wrapping or curving the fiber may also cause light to exit a side surface of the fiber F as shown in FIG. 4. Thus, causing the at least one or a plurality of the optical fibers 28 to be curved along their longitudinal axis can enable the fiber to emit light or illuminate into a predetermined or desired direction, such as the direction indicated by point B in FIG. 2. It is desirable to capitalize on this feature by providing a woven pattern of the plurality of optical fibers 28 with fill thread T in order to generate a predetermined lighting function or result. A variety of weave patterns may be selected to produce a desired lighting function, effect or characteristic. In some embodiments, a light panel may include fibers which are altered as discussed in FIG. 3, and also woven, as discussed in FIG. 4. Combinations of fiber alteration and weave may be used to achieve versatile lighting functionality including spatial and dynamic effects for light output from the panel 32.

Figure 5A:
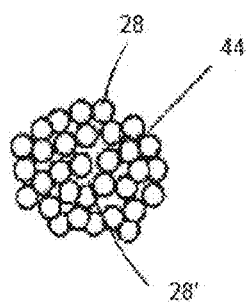
FIGS. 5A and 5B show alternative embodiments of a fiber bundle used in a lighting device in accordance with embodiments of the invention.
Figure 5B:
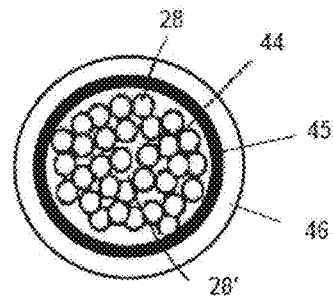

Returning again to FIG. 2, the plurality of optical fibers 28 extend out of the panel 32 and are gathered and combined in a bundle 44 which functions as a light-receiving end or input end of the panel 32. The fiber bundle 44 may include any bundling element or substance suitable to maintain the fibers 28 in a predetermined cross sectional shape. FIGS. 5A and 5B show alternative embodiments of a fiber bundle 44 and bundling elements used in a lighting system in accordance with embodiments of the invention. As seen in FIG. 5A, the fiber bundle 44 may be maintained by adhesive 28' provided between the fibers 28 as the bundling element to bond the fibers together. Alternatively, the fiber bundle 44 may be maintained by a coupling 46 (such as a ferrule) as shown in FIG. 2 and detailed in FIG. 5B. The bundle 44 may also include a wrap, sleeve, adhesive, tape, resin or the like to facilitate holding the fibers 28 in the bundled position as illustrated by 45 in FIG. 5B.

Figure 6:
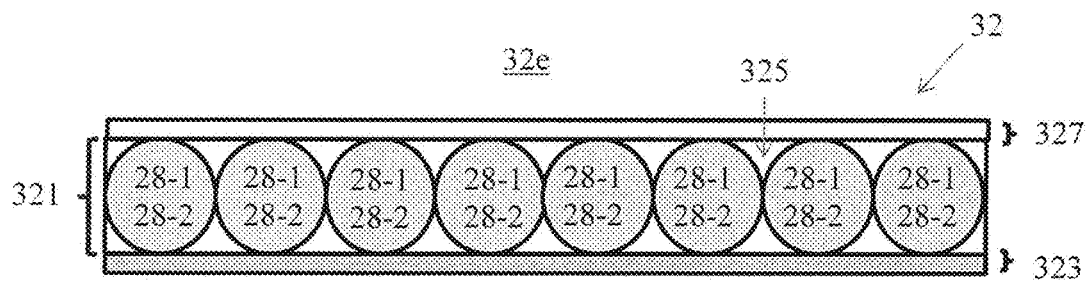
FIG. 6 is a cross-sectional view of the optical fiber panel of FIG. 1.

FIG. 6 provides a schematic view of a cross-section of the lighting panel of FIG. 1. As seen, the panel 32 includes a fiber portion 321, an optical reflective portion 323, and a transmission portion 327. The fiber portion 321 includes a plurality of fibers 28 arranged side-by-side in an array. As shown in FIG. 6, the fibers 28 may be encapsulated in a surrounding material 325 such as resin. Adhesive layers may be used to connect portions of the panel as discussed below. The reflective portion 323 and transmission portion 327 are optional. The reflective portion 323 reflects light output from a backside of the fibers 28 to facilitate light output from a single side of the panel 32 in illumination region 32e. The light transmission portion 327 may be provided at the light emitting side of the panel to achieve various optical effects to light output from the fibers 28. While shown as planar layers in FIG. 6, portions 321, 323 and 327 may be other non-planar forms. Further, the terms "portion" and "layer" are used interchangeably herein and encompass single and multilayer structures, as well as integral structures having added materials and/or optical structures formed thereon.

In the embodiments of FIGS. 1 and 6, optical fibers 28 are connected to the first and second light sources 20-1 and 20-2 respectively. That is, each fiber 28 is connected to both light sources at respective ends of the fiber. As used herein, the designation 28-1 denotes a fiber 28 connected to light source 20-1, and 28-2 denotes a fiber connected to the second light source 20-2. Hence, in FIG. 6, each fiber is designated 28-1, 28-2. Shading of components such as light sources 20, fibers 28, reflective layer 323, and illumination region 32e generally denotes differences in characteristics of light emitted, reflected or otherwise output from the shaded component. Thus, in FIGS. 1 and 6, light sources 20-1 and 20-2 provide the same type of light, which is emitted from each fiber 28. As used herein "same type of light" means light intended to have identical characteristics despite manufacturing variations of the light sources and/or optical components associated therewith. This configuration increases brightness of light output from panel 32 when sources 20-1 and 20-2 simultaneously provide first and second light to the panel 32.

Further, control of the state of the light sources can achieve different lighting functions from the panel 32. Where same type light sources are used, switching between a single source and both sources provides different brightness outputs from the panel at different times. For example, either light source 20-1 or 20-2 (alone) can provide red light to panel 32 to satisfy a lower brightness tail light function in a vehicle, while both sources 20-1 and 20-2 can simultaneously couple red light to the panel 32 to satisfy a higher brightness brake light function. Light sources 20-1 and 20-2 can also be controlled to balance use of the sources over the life of the lighting device.

Light sources 20-1 and 20-2 may also provide different types of light to the panel 32 in the configuration of FIGS. 1 and 6. For example, one source may provide red light for a tail light or brake light function, while the other source provides white light for a reverse light function. If desired, the different type sources can be simultaneously activated to provide color mixing for additional functionality such as aesthetic effects of the vehicle lighting. Switching of light sources may be controlled by a user activated manual switch and/or by a processor or controller such as those described in FIG. 23 herein.

Figure 7A:
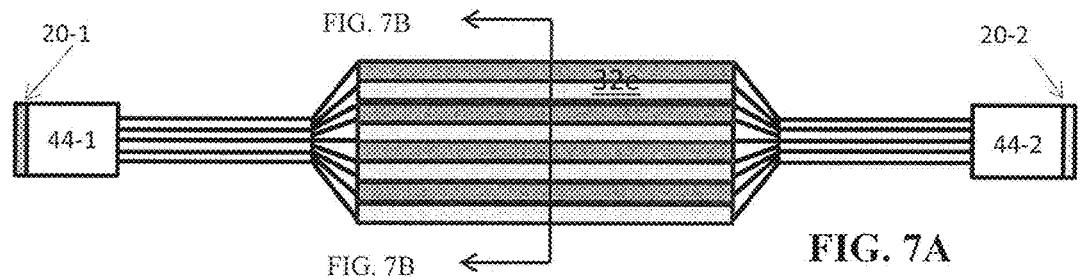
FIGS. 7A and 7B depict respective planar and cross-sectional views of an optical fiber panel in accordance with another embodiment of the invention.
Figure 7B:
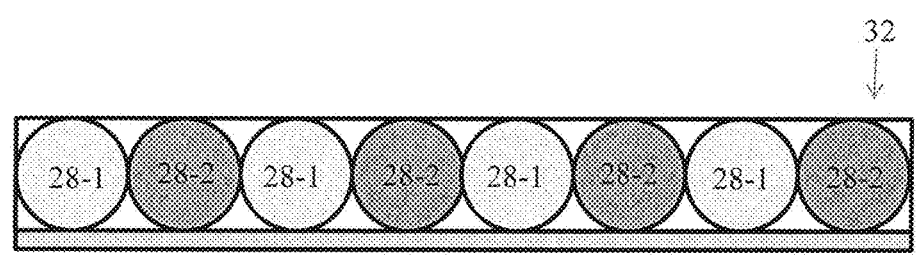

In some embodiments, the first and second light sources may be coupled different fibers in the panel 32. For example, as shown in FIGS. 7A and 7B, a plurality of first optical fibers 28-1 (i.e., fibers coupled to source 20-1) may be alternatingly arranged with a plurality of second optical fibers 28-2 (i.e., fibers coupled to source 20-2). This arrangement can provide a spatial light pattern or light mixing at the illumination region 32e where different types of light sources 20-1 and 20-2 (e.g., different color lights) are used as shown in FIGS. 7A and 7B. FIG. 7A shows discrete light outputs emitted from the region 32e, but light mixing may occur and be facilitated where desired. Further, light sources 20-1 and 20-2 may be the same type to allow an alternative configuration for switching the level of brightness from panel 32.

Figure 8A:
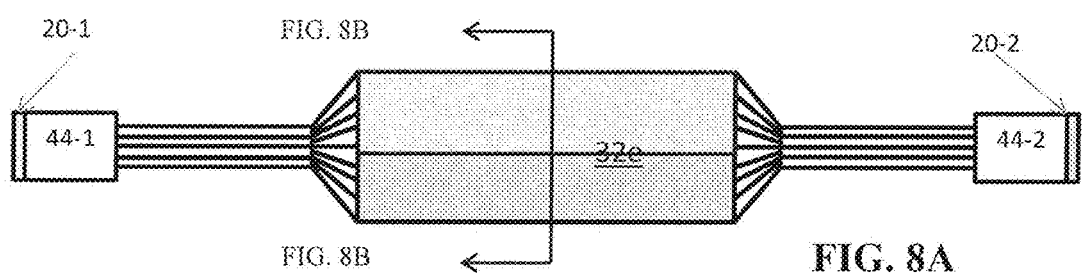
FIGS. 8A, 8B and 8C depict alternative optical fiber panels in accordance with embodiments of the invention.
Figure 8B:
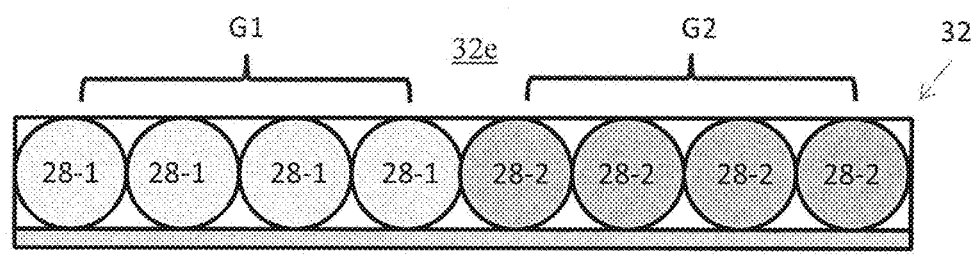

Alternatively, as seen in FIGS. 8A and 8B, the plurality of first optical fibers 28-1 are adjacently arranged in a first group G1, and the plurality of second optical fibers 28-2 are adjacently arranged in a second group G2. The first and second groups may be repeated and alternatingly arranged with one another. Such arrangement may provide spatial bands of light output from the panel 32 as shown in FIG. 8A. The number of adjacent fibers in a group can be varied to achieve a desired spatial effect. For example, the individual alternating arrangement of FIGS. 7A and 7B may provide better light mixing, while the alternating of groups of fibers in FIGS. 8A and 8B can permit spatially discernable regions of the panel.

Turning again to FIG. 6, spatial effects of the light output in the illumination region 32e may also be accomplished by design aspects of the panel 32. Conventionally, improvements to fiber optic light panels have focused on achieving a desired light output from the illumination region 32e as a whole. For example, the fiber portion 321, the reflective portion 323 and the transmission portion 327 typically have optical properties which are homogeneous across the area of the panel but optimized to achieve a desired light output from the illumination region 32e. The present inventors, discovered, however, that aspects of the fiber optic panel 32 may be varied to achieve spatial variation of light output characteristics in region 32e. Such spatial variation can be used to obtain different functionality from a single panel and/or to enhance styling of the vehicle. Further, spatial variation of design aspects of the panel 32 can be combined with control of the light sources to achieve a desired effect.

In some embodiments, one or more of the fiber portion 321, reflecting portion 323 and transmission portion 327 can be spatially varied in type or characteristics to achieve a desired light output across illumination region 32e. Light type can include color, hue, tint, tone and/or shade of the light output in region 32e, as well as intensity, brightness or any other desired photometric characteristic. The present disclosure generally uses shading of fibers 28 and the light emitting region 32e to represent different light output characteristics without regard to the cause of such differences in light output. For example, the different shades of fibers in FIG. 7B represent different light types provided by light sources 20-1 and 20-2, but may also denote different design of the fibers themselves, the reflective layer and or the transmission layer of the panel.

In some embodiments, the fiber layer 321, reflective layer 323 and/or transmission layer 327 can be varied in texture, material composition or other physical properties across the panel area to achieve corresponding spatial variation light output characteristics in the illumination region 32e. In one example, a texture of the reflective layer 323 can be varied to achieve different degrees of diffusivity across the panel. Further, any of the layers 321, 323, 327 can be enhanced with pigments, nanoparticles, phosphors or other additives to change optical properties across the panel area. The chosen additive can be graded in density across the panel 32 to achieve spatial effects, and/or the type of additive can be varied across the panel area. In one example, phosphors can be included in any portion of the panel 32 to affect wavelength (color) output of the panel, and/or diffusing materials included to affect light scattering of the light output from the panel 32. A phosphor, most generally, is a substance that exhibits the phenomenon of luminescence. To emit white light or amber light, the phosphor can include, for example, at least one of the following compounds: $Y_3Al_5O_{12}$: $Ce^{3+}$ (YAG), (Sr, Ba) $2SiO_4$:$Eu^{2+}$, Cax (Si, Al)$_{12}$ (O, N)$_{16}$: $Eu^{2+}$. These compounds convert blue light into yellow light. By adjusting the composition of the phosphor, the additive synthesis of these two colors will be a white light or an amber light.

Spatial variation in the fiber layer 321 may be achieved by varying properties of the material 325 or the fibers 28. For example, material 325 may include additives to achieve spatial effect as discussed above. Each fiber 28 may itself have physical variations along its length to vary light output along the length. The fibers 28 may be identical across the panel 32, or the fibers 28 may be of different types across the panel to cause different light output characteristic across region 32e. For example, the fibers 28 may have different abrasion or bend characteristics across the panel 32 to vary light output across region 32e. Further, spacing or pitch of the fibers 28 may be used to change light output characteristics across the illumination region 32e.

Spatial variation of light in the illumination region 32e may also be achieved by use of multiple optical entries to the panel 32. Such variation may be achieved based on the direction of light propagation along a fiber 8 of the panel 32. For example, a fiber 28 may be modified or abraded such that light output intensity is greater at an input end of the individual fiber. Thus, fibers entering the panel from different sides will achieve spatial effect of intensity over the panel area.

Any of the above spatial effects based on the design of the panel 32 can be achieved by a single light source coupled to the panel 32, or may be combined with a panel using plural light sources to provide versatile functionality and spatial effects to panel 32. Variation in a physical property of the panel can be achieved by an integral layer having continuously varying property, and/or by combination of discrete portions to achieve a varying effect. For example, the reflective layer 323 may be made of several discrete sheets having different properties and joined side-by-side to provide a reflective layer for a single panel 32. Thus, the term panel refers to a generally continual surface rather than an integral layer or sheet of material.

Figure 8C:
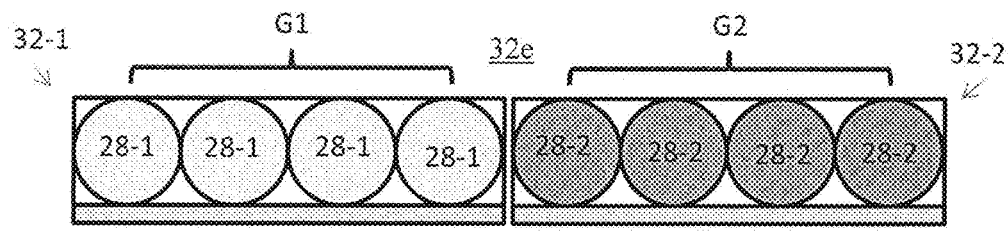

Similarly, the plurality of optical fibers 28 may be provided in an integral lighting panel 32, or in different lighting sub-panels combined to form a panel 32. For example, FIG. 8C shows an alternative way to achieve the effect of FIGS. 8A and 8B. In FIG. 8C, the plurality of first optical fibers 28-1 and the plurality of second optical fibers 28-2 are provided in separate lighting sub-panels 32-1 and 32-2 respectively. This promotes modular assembly of light sub-panels 32 having different physical properties with different light sources to achieve a desired effect in illumination region 32e from a combined panel.

Figure 9A:
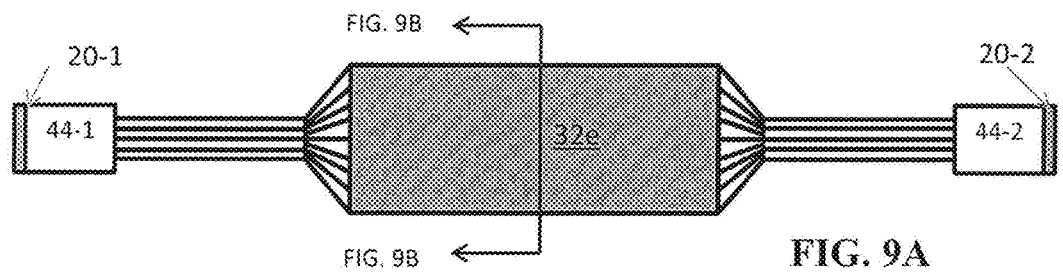
FIGS. 9A, 9B and 9C depict respective planar and cross-sectional views of an optical fiber panel having fibers in different planes in accordance with another embodiment of the invention.
Figure 9B:
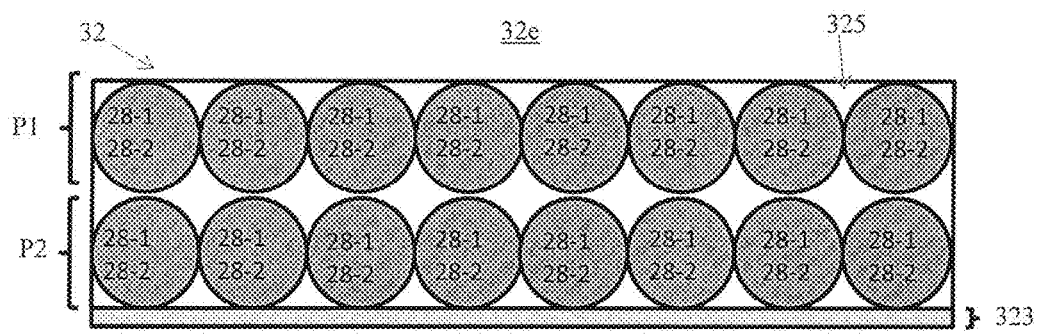
Figure 9C:
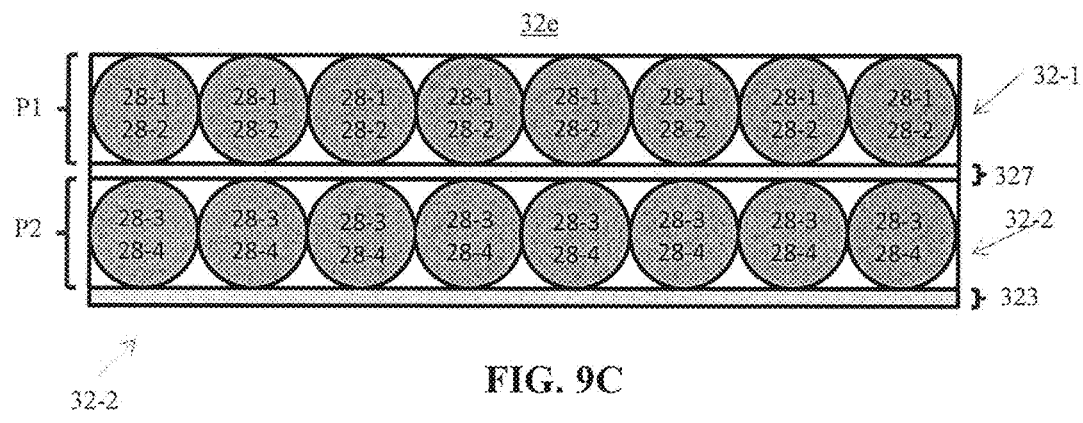

In some embodiments, the optical fibers 28 can be provided in different planes. For example, in the embodiment of FIGS. 9A and 9B, a first group of optical fibers are each positioned in a first plane P1, and a second group of optical fibers are each positioned in a second plane P2. These first and second planes P1 and P2 may be encapsulated in material 325 as an integral structure as shown in FIG. 9B. Alternatively, the planes P1 and P2 can be provided in separate light sub-panels 32-1 and 32-2 joined with adhesive 327 as seen in FIG. 9C. The adhesive 327 is preferably an optical adhesive to promote the desired light output. The adhesive 327 may be varied to achieve spatial effects as discussed with respect to the fiber layer, reflective layer and transmission layer.

In the embodiment of FIG. 9B, each of the fibers 28 is connected at opposite ends to a respective light source 20-1, 20-2 of the same type, similar to the embodiment of FIGS. 1 and 6 discussed above. In the embodiment of FIG. 9C, the fibers in plane 2 are connected to two additional light sources 20-3, 20-4 of the same type. This further enhances brightness of the panel 32 and provides a greater degree of brightness control. That is, four levels of brightness can be achieved based on the number of light sources 20-1, 20-2, 20-3 and 20-4 simultaneously activated. This can be combined with control techniques (such as pulse width modulation) of a driver circuit for the light sources. Still alternatively, the light sources 20-1, 20-2, 20-3, 20-4 can be different types and controlled to achieve mixing, or switching between colors, for example.

Figure 10A:
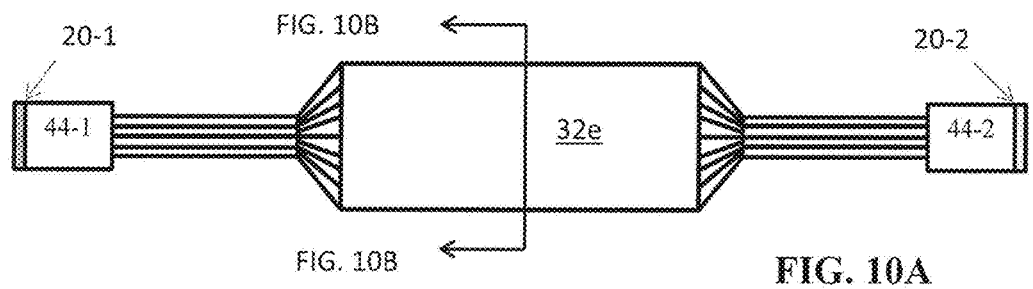
FIGS. 10A and 10B depict an optical fiber panel in accordance with another embodiment of the invention having fibers in different planes.
Figure 10B:
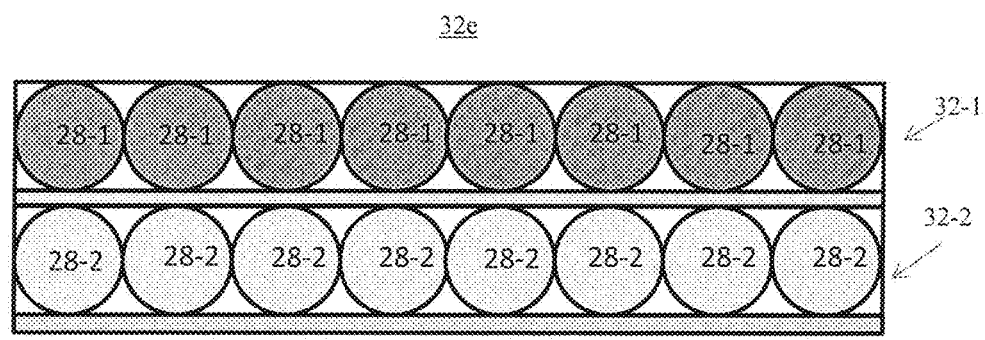

In some embodiments, the fibers of each plane may be connected to respective light sources 20-1 and 20-2, as shown in FIGS. 10A and 10B. As seen from the shading, the light sources 20-1, 20-2 in this embodiment are different types, which permits alternate light outputs at region 32e of panel 32. For example, light source 20-1 may be powered by itself to provide a first color output, and light source 20-2 can be powered by itself to give a second color output. Both sources 20-1, 20-2 can be powered together to provide a mixed light of a third color from illumination region 32e. These different color outputs can serve different automotive lighting functions.

Figure 11A:
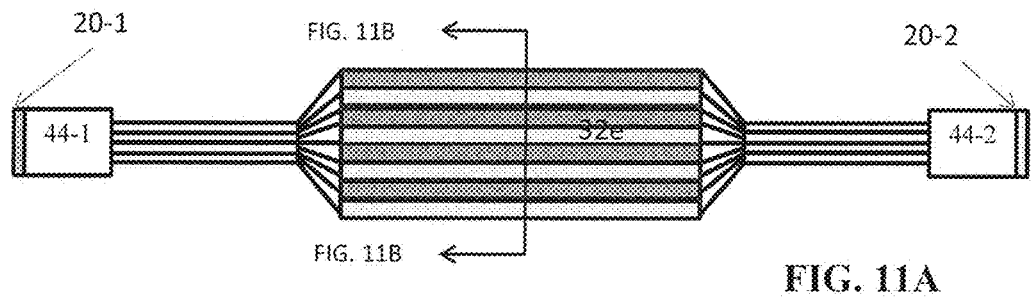
FIGS. 11A and 11B depict an optical fiber panel in accordance with another embodiment of the invention having fibers in different planes.
Figure 11B:
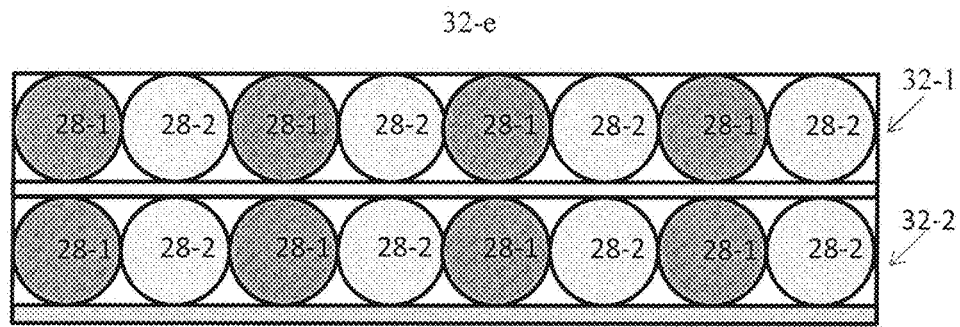
Figure 12A:
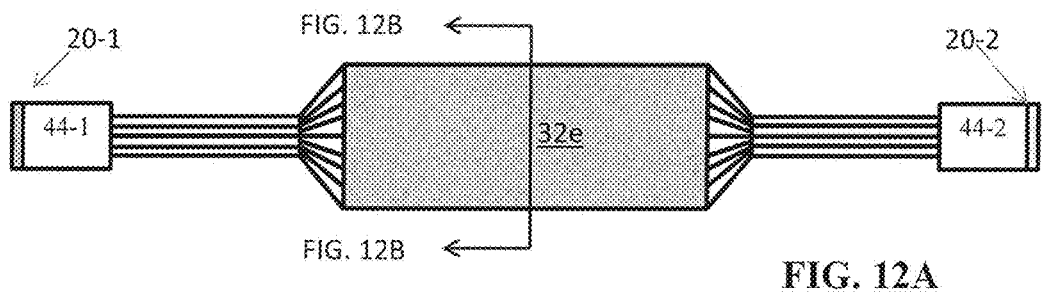
FIGS. 12A and 12B depict an optical fiber panel in accordance with another embodiment of the invention having fibers in different planes.
Figure 12B:
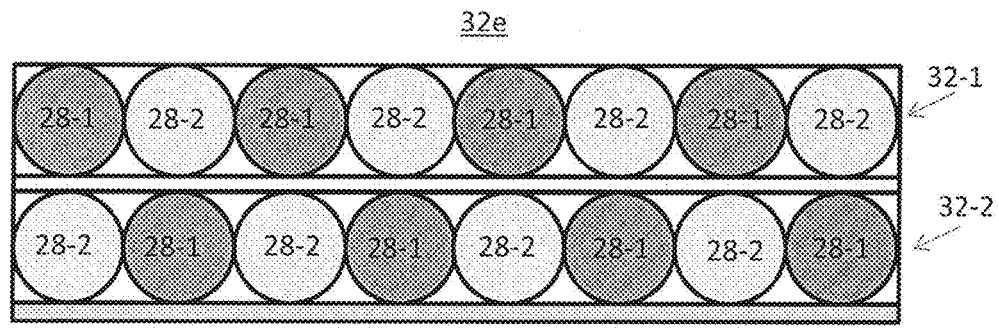
Figure 13A:
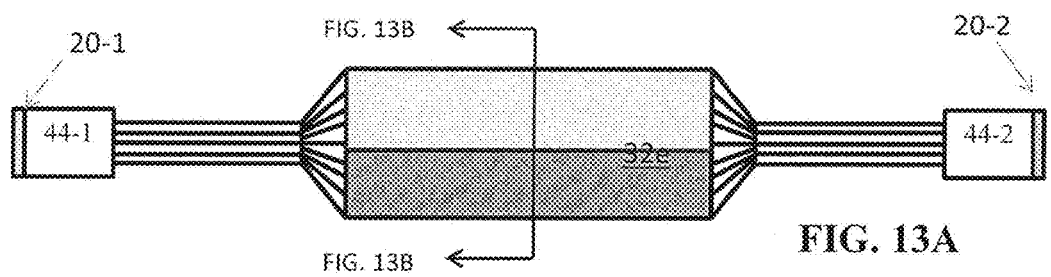
FIGS. 13A, 13B and 13C depict an optical fiber panel in accordance with another embodiment of the invention.
Figure 13B:
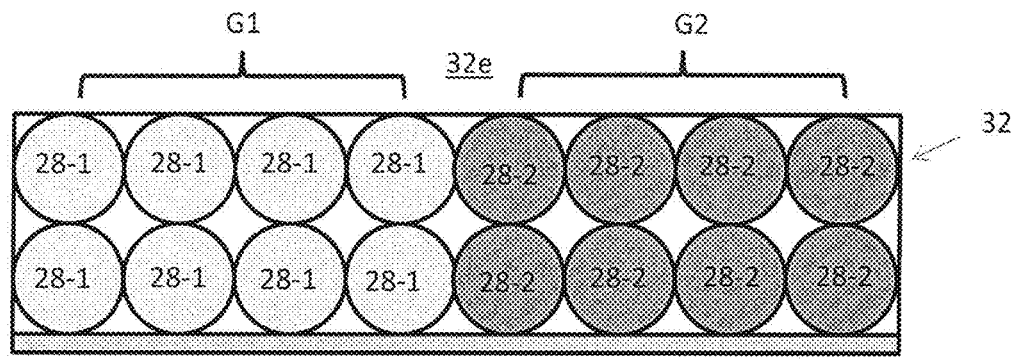
Figure 13C:
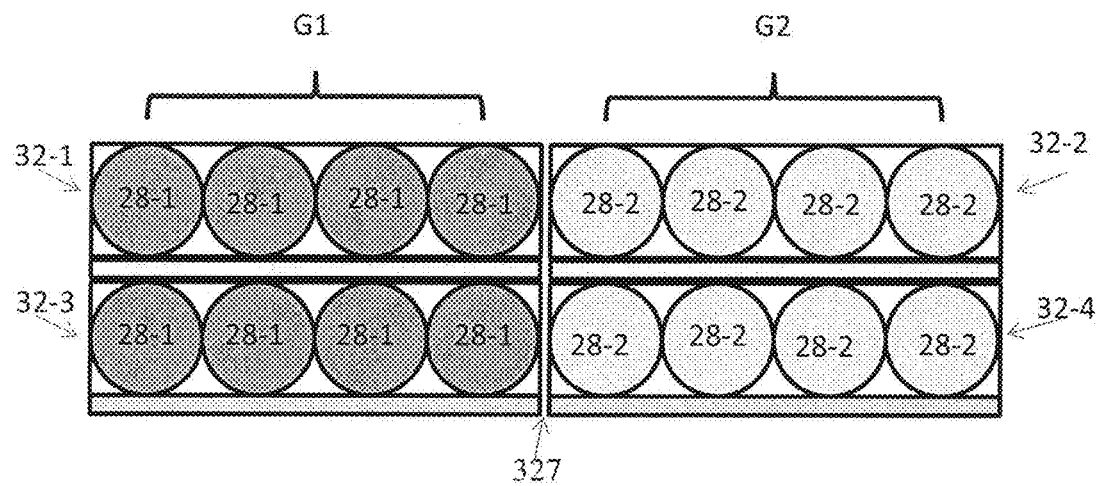
Figure 14:
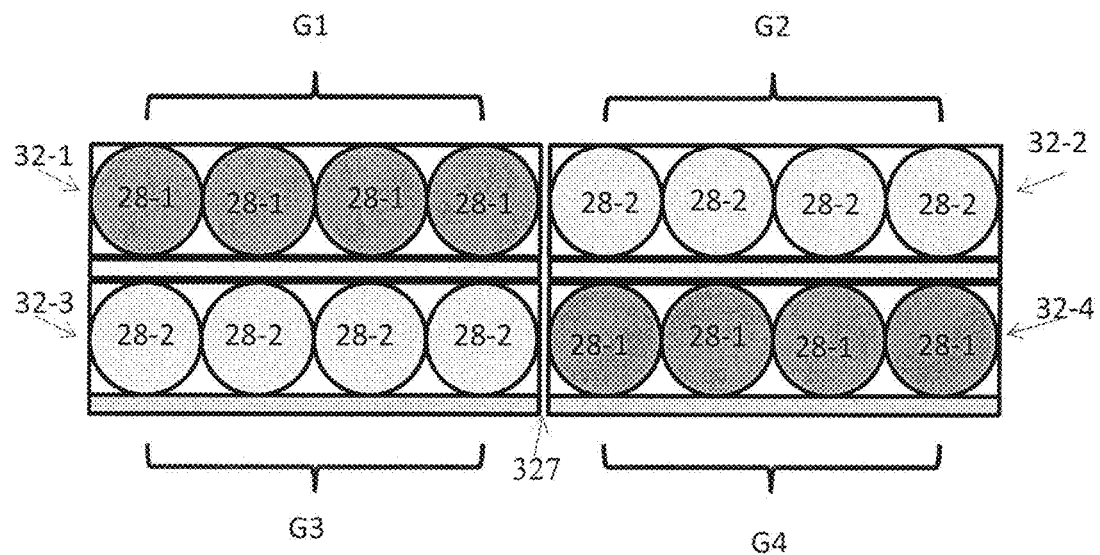
FIG. 14 depict an optical fiber panel made up of several subpanels in accordance with another embodiment of the invention.
Figure 15:
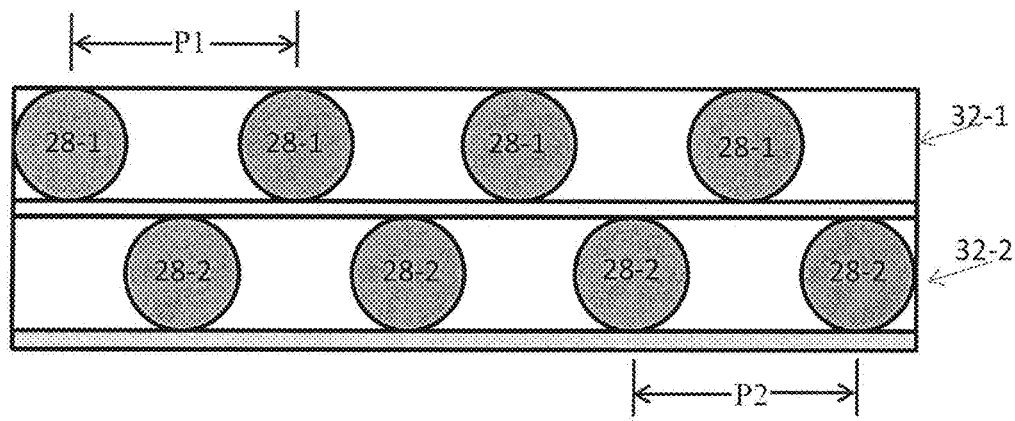
FIG. 15 depicts an opticalfiber panel having pitched fibers in accordance with another embodiment of the invention.

In still other embodiments, panels of alternatingly arranged fibers such as shown in FIG. 7B may be used as sub-panels which are stacked to achieve a desired effect. Fibers coupled to a common light source may be aligned between layers as seen in FIGS. 11A, 11B to enhance brightness with spatial effects, or offset as seen in FIGS. 12A, 12B to promote color mixing for example. The first and second fibers 28-1 and 28-2 may be provided in alternating groups among the layers. As seen in FIGS. 13A and 13B, groupings G1 and G2 may be formed within an integral panel 32, or provided by four sub-panels 32-1, 3-2, 3-3, and 32-4 arranged as shown in FIG. 13C. In addition, groups of fibers ay be staggered among layers as shown in FIG. 14. Still further, as seen in FIG. 15, the first optical fibers 28-1 may be spaced at a first pitch P1 in the first plane 32-1, while the plurality of second optical fibers 28-2 are spaced at a second pitch P2 in the second plane 32-2. These pitches P1, P2 may be the same or different depending on the desired lighting effects. In one example, the pitch P1 can vary continuously across the panel 32 to achieve spatial effect.

Figure 16A:
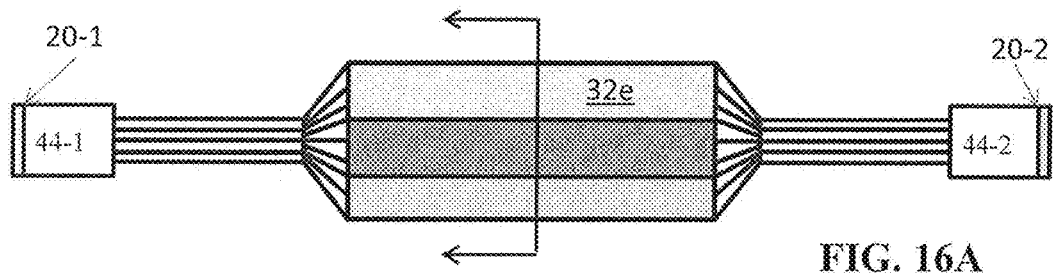
FIGS. 16A and 16B depict an optical fiber panel made up of partially overlapping sub-panels in accordance with another embodiment of the invention.
Figure 16B:
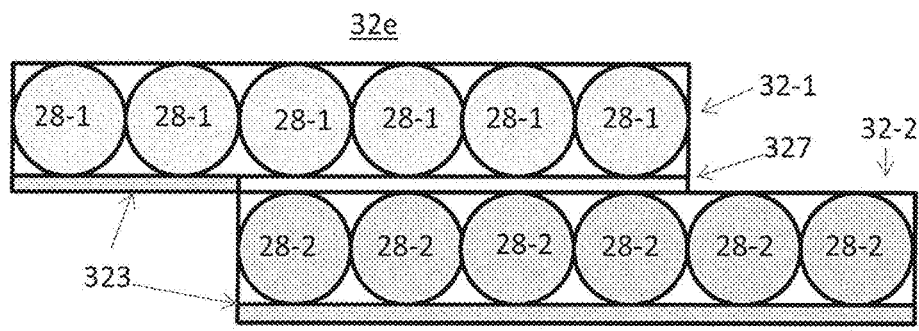

In addition, full overlap of sub-panels is not necessary. In the embodiment shown in FIG. 16A and 16B, the lighting device includes a plurality of first optical fibers 28-1 provided in a first light panel 32-1, which overlaps a second light panel 32-2 which includes the plurality of second optical fibers 28-2. This can enhance brightness in the region of overlap for yet another spatial effect. As seen in FIG. 16B, first panel 32-1 includes reflective layer 323 as well as optical adhesive layer 327.

In some embodiments discussed above, the plurality of first optical fibers 28-1 receive the first light from a first side of the illumination region 32e, while the plurality of second optical fibers 28-2 receive the second light from an opposite side of the illumination region 32e. With this arrangement, the first and second lights travel in opposite directions in the illumination region 32e. In this embodiment, identical light sources and fibers may be used to increase brightness and uniformity of light output from the panel. Specifically, lights traveling in opposite directions in alternate fibers in the illumination region 32e may compensate for inhomogeneity in light output along each fiber.

Figure 17:
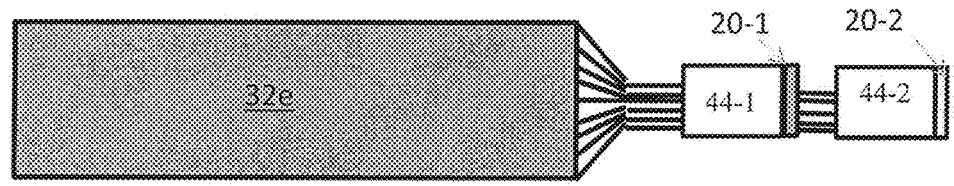
Figure 18A:
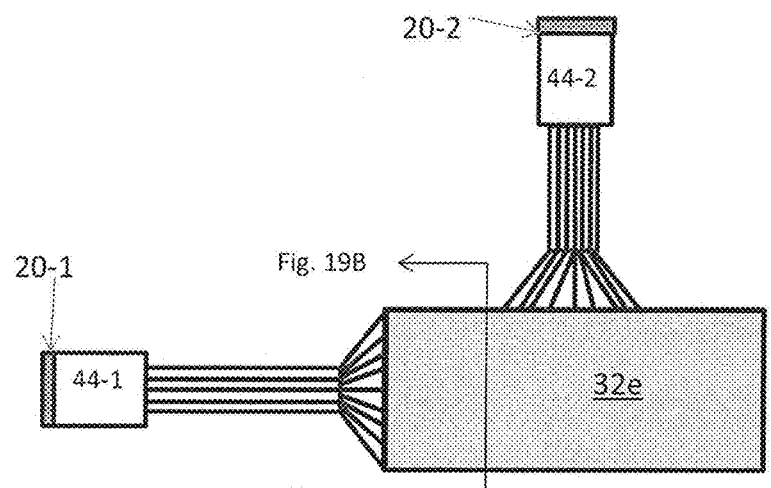
FIGS. 18A, 18B and 18C show light panels having light sources on different sides of the illumination region in accordance with an embodiment of the invention.
Figure 18B:
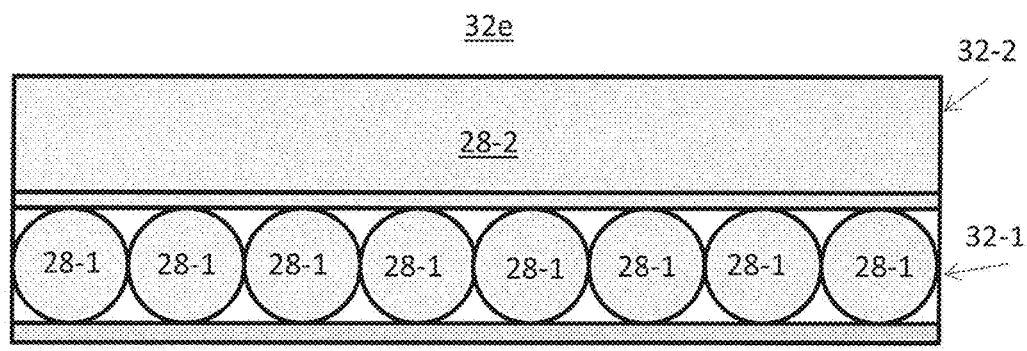
Figure 18C:
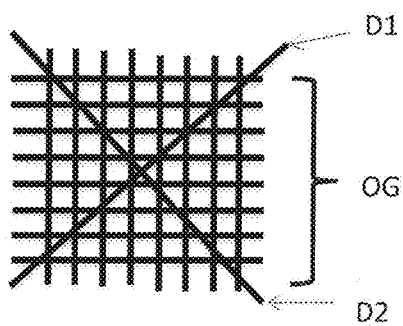

Alternatively, in the embodiment of FIG. 17, the plurality of first optical fibers and the plurality of second optical fibers each receive light from a same side of the illumination region 32e. This may be required to meet constraints in the environment, such as a light housing, in which the assembly is used. With this arrangement, the first and second lights travel in a same direction in the illumination region 32e. Thus, it may be desirable for the first and second optical fibers 28 to have graded characteristics, such as abrasion patterns graded along a length thereof, to promote homogeneous light output along the fiber 28, In the embodiment shown in FIG. 18A and 18B, the lighting device includes a plurality of first optical fibers 28-1 provided in a first light panel 32-1, which is positioned to cross the second light panel 32-2, which includes the plurality of second optical fibers 28-2. As seen in FIG. 18C, this creates an orthogonal grid pattern OG which can promote homogeneous output in region 32e. More complex fiber crossing arrangements such as diagonal fibers D1 and D2 may optionally be provided to implement more complex lighting effects.

Figure 19A:
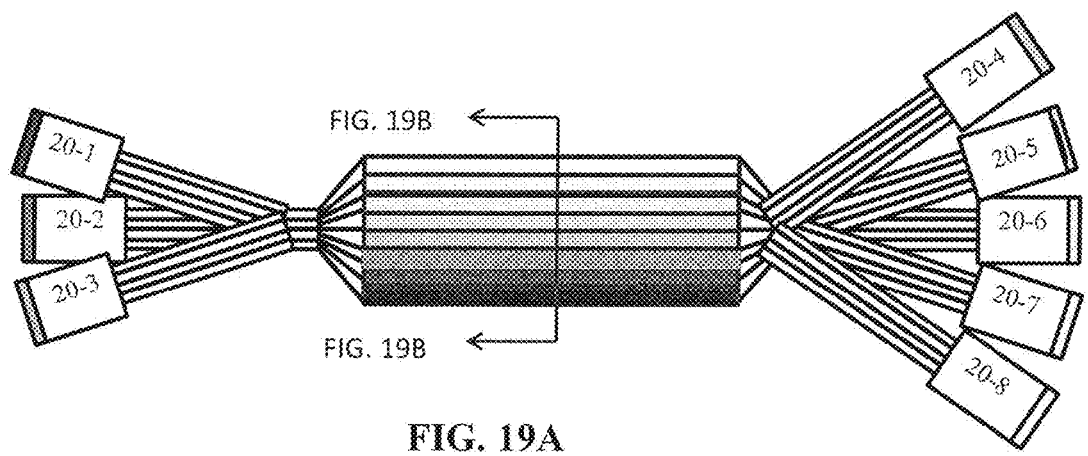
FIGS. 19A and 19B show lighting panels having multiple light sources.
Figure 19B:
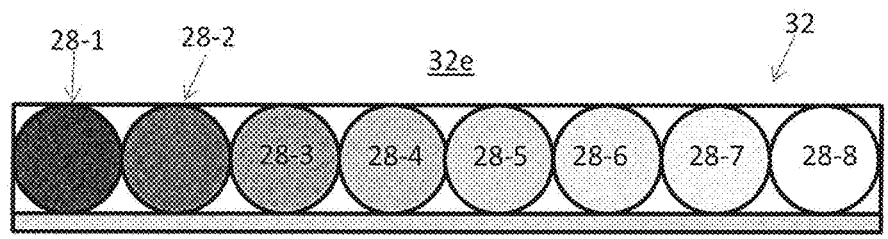

While the above examples show two light sources, it should be understood that any number of light sources can be provided to a panel. As seen in FIGS. 19A and 19B, panel 32 includes eight light sources 20-1 through 20-8 having different light types. Such multiple sources may be provided to a single layer as shown in FIG. 16B, or to multiple layers depending on the desired effect. Greater number of light sources and sophisticated control techniques can achieve greater versatility in light output and functionality of the panel 32. Control of the light sources includes controlling an on/off state of the light source, as well as control of a driver circuit to achieve continuous variation of light output characteristics from the panel. For example, PWM control of an LED driver circuit can achieve continuous adjustment from low beam to high beam output of a headlight assembly. Similarly, control of current of a driver can provide color adjustment for light sources having a wavelength output that is dependent on current. Any control techniques of the light sources or light panel output may be achieved by use of a software controlled processor such as that described in the vehicle environment of FIG. 23 below.

Figure 20A:
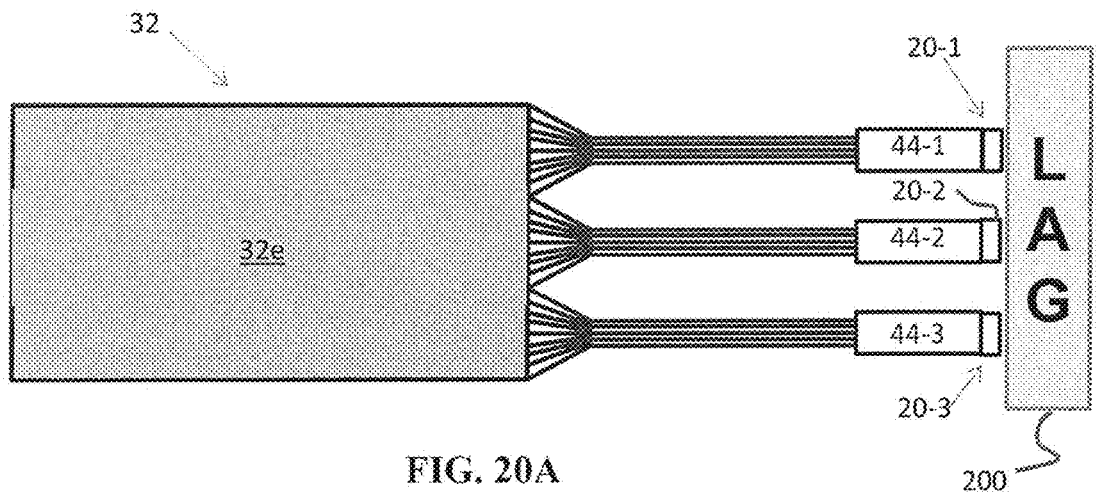
FIGS. 20A and 20B show a comparison of fiber panels having different light sources or a common light source to supply fiber bundles of a panel.
Figure 20B:
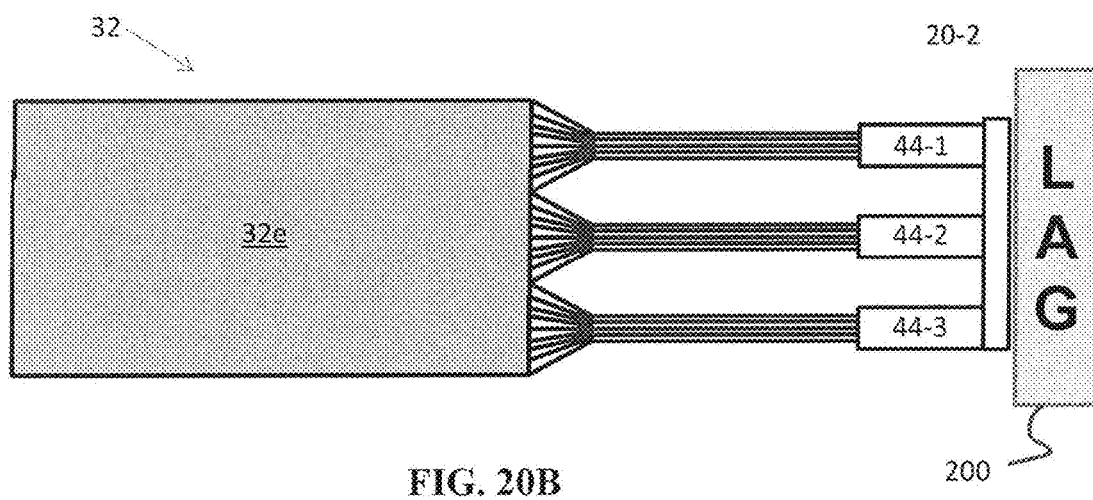

In some embodiments, timing control of light sources 20 can be combined with spatial effects of the panel to achieve dynamic lighting effects in the illumination region 32e. For example, FIG. 20A shows a light panel 32 connected to separate light sources 20-1, 20-2 and 20-3 by respective fiber bundles 44-1, 44-2 and 44-3. Separate light sources (as opposed to common light source shown in FIG. 20B) permits dynamic effects LAG 200 is a printed circuit board providing electronics and optics for switching light sources 20-1, 20-2, 20-3 according to predetermined timing, which may be stored in a memory. LAG 200 may include one or more of the memory, processors, controllers or interfaces discussed in the vehicle environment of FIG. 23 to achieve versatile functionality, spatial effects and/or dynamic effects.

Figure 21A:
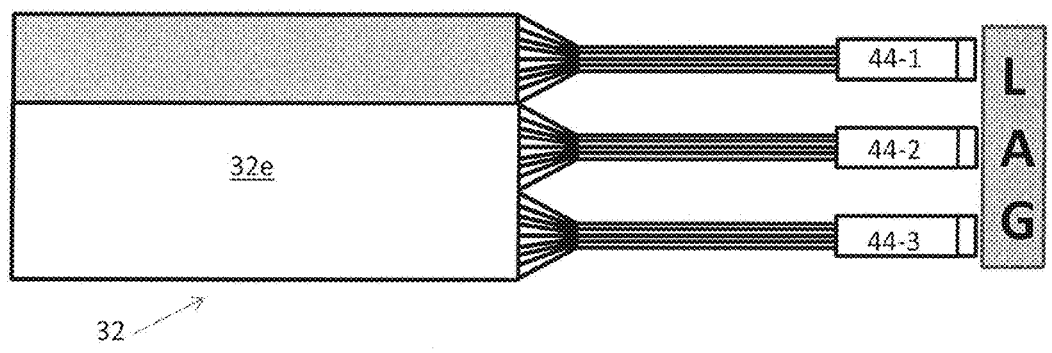
FIGS. 21A, 21B and 21C illustrate a dynamic lighting effect of an optical panel.
Figure 21B:
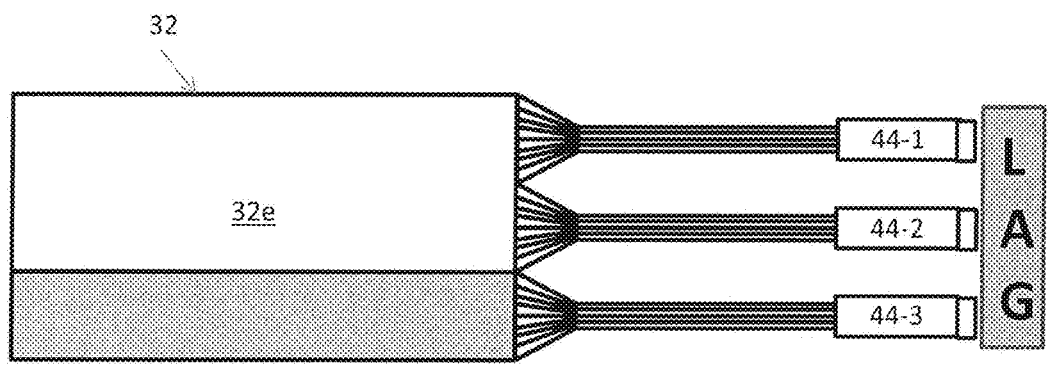
Figure 21C:
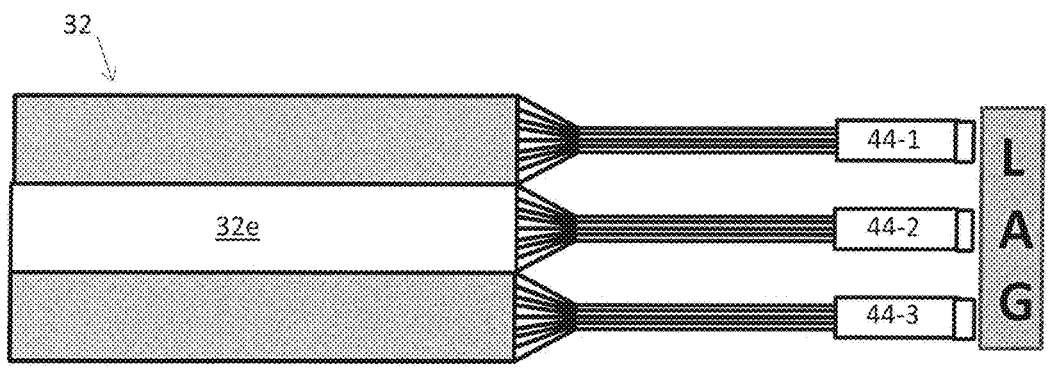

FIGS. 21A-21C illustrate a dynamic effect that can be achieved by embodiments of the invention. As seen in FIG. 21A, light panel 32 is optically coupled through three fiber bundles 44-1 44-2 and 44-3 to respective light sources 20-1, 20-2 and 20-3. The fibers of each bundle are arranged in alternating groups as described in FIG. 8B or FIG. 11B above. As noted above, LAG 200 is a printed circuit board providing the necessary electronics and optics for achieving dynamic effects in the panel 32 example, at a first time shown in FIG. 21A, only a first light source 20-1 provides light to the panel 32, thereby causing light output from a top portion of illumination region 32e. At a second time shown in FIG. 21B, light source 20-3 illuminates a bottom portion of region 32e. In FIG. 21C, light sources 20-1 and 20-3 are simultaneously illuminated at a third time. Thus, the light sources 20-1, 20-2 and 20-3 may be activated according to a timing which achieves dynamic lighting across the panel 32. Such dynamic effect can be used to enhance exterior or interior lighting functionality.

In one embodiment, dynamic lighting effects can be used in "intelligent" or "active" front lighting systems that change light characteristics to adapt to various driving conditions to enhance the driver's visual perception. Real time changes in the light output of a panel 32 can be used in conjunction with mechanical actuators that adjust the vertical position of the panel, or horizontal position of the panel. Alternatively, dynamic control of the panel lighting device can be used to achieve beam shaping and direction adjustment without the need for mechanical movement. For example, a panel 32 can be formed in a three dimensional shape, such as a dome, and various positions of the panel illumination region 32e can be activated to achieve the effect of horizontal and/or vertical movement of the panel. Optics integral to or associated with the panel can facilitate this functionality. Firmware controls of such dynamic systems can be downloaded from manufacturers in the vehicle environment of FIG. 23 for example.

As another example, fiber optic light panels can be used for interior lighting, and dynamic control can provide versatile aesthetic effects. Lighting control algorithms may be provided by software "apps" that can be loaded into the vehicle environment of FIG. 23 to change the look of the interior lighting to suite a particular user.

Figure 22A:
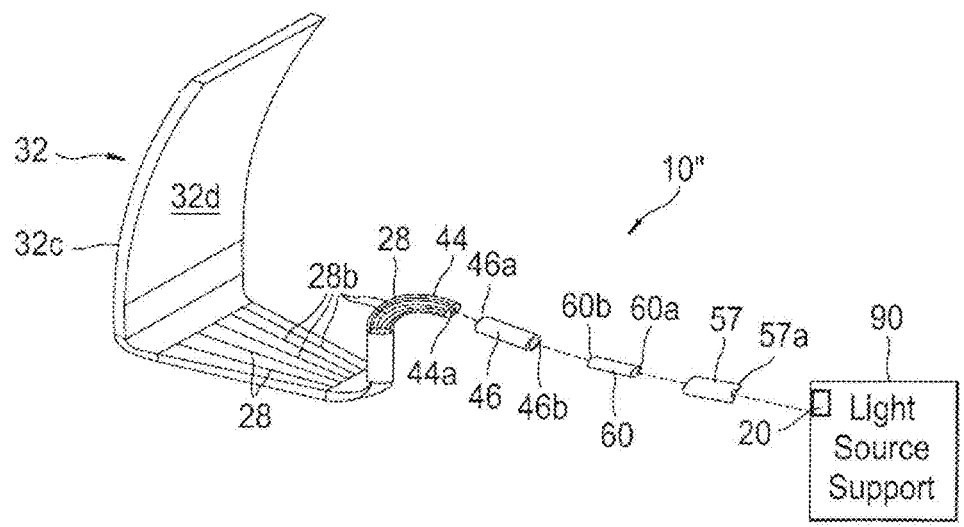
FIGS. 22A and 22B are views of a vehicle including a fiber optic light panel device according to embodiments of the invention.
Figure 22B:
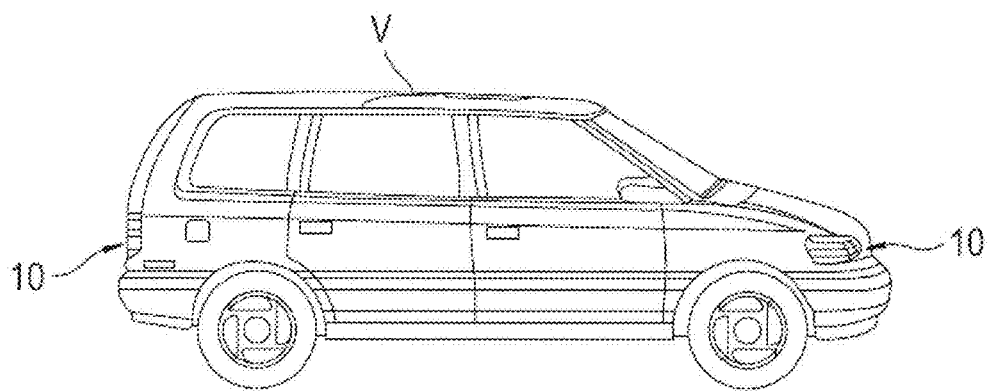

FIG. 22A is an exploded view showing arrangement of the components of a vehicle lighting device in accordance with an embodiment of the invention. For example, the device 10' may be included in the headlight or taillight of a vehicle V as shown in FIG. 22B. As seen in FIG. 22A, the system 10' includes a panel 32 having a light emitting side 32e through which light from the plurality of optical fibers 28-1 and 28-2 is emitted As seen, fibers 28 are arranged in a fiber array, and may be embedded in a substrate which could be a polymer, resin or other conventional substrate. Portions 28b of the plurality of optical fibers 28 extend out of the panel 32 and are gathered and combined in a fiber bundle 44 to define a light-receiving end or input end 44a. In the embodiment of FIG. 20A, the input end 44a becomes operatively positioned in a first end 46a of a mechanical coupler 46 having opposing end 46b. The coupler 46 may be a ferrule and include a wrap, sleeve, adhesive, tape, resin or the like to facilitate holding the fibers 28 in the bundled position illustrated in FIG. 4B.

Optical coupler 60 has a first and second ends 60a and 60b. The first end 60a is mechanically coupled to, and received in, a hollow plug 57. Second end 60b is received in the second end 46b of coupler 46 to optically align coupler/60 to the fiber bundle 44. During assembly, an end 57a of the plug 57 is coupled to the light source support of a vehicle light housing to provide optical coupling with the light source 20. In the illustration, the optical coupler 60 is an integral one piece construction made of silicone or plastic. The optical coupler 60 may be an optical mixer configured to improve a homogeneous property of light coupled to the fiber bundle as disclosed in U.S. patent application Ser. No. 15/210,189, filed by the present Applicants on Jul. 14, 2016. The entire content of this application is incorporated herein by reference.

Advantageously the embodiments described herein are particularly suited for exterior lighting and in environments where it is necessary that the lighting match or conform to the contour or styling of the vehicle V.

Figure 23:
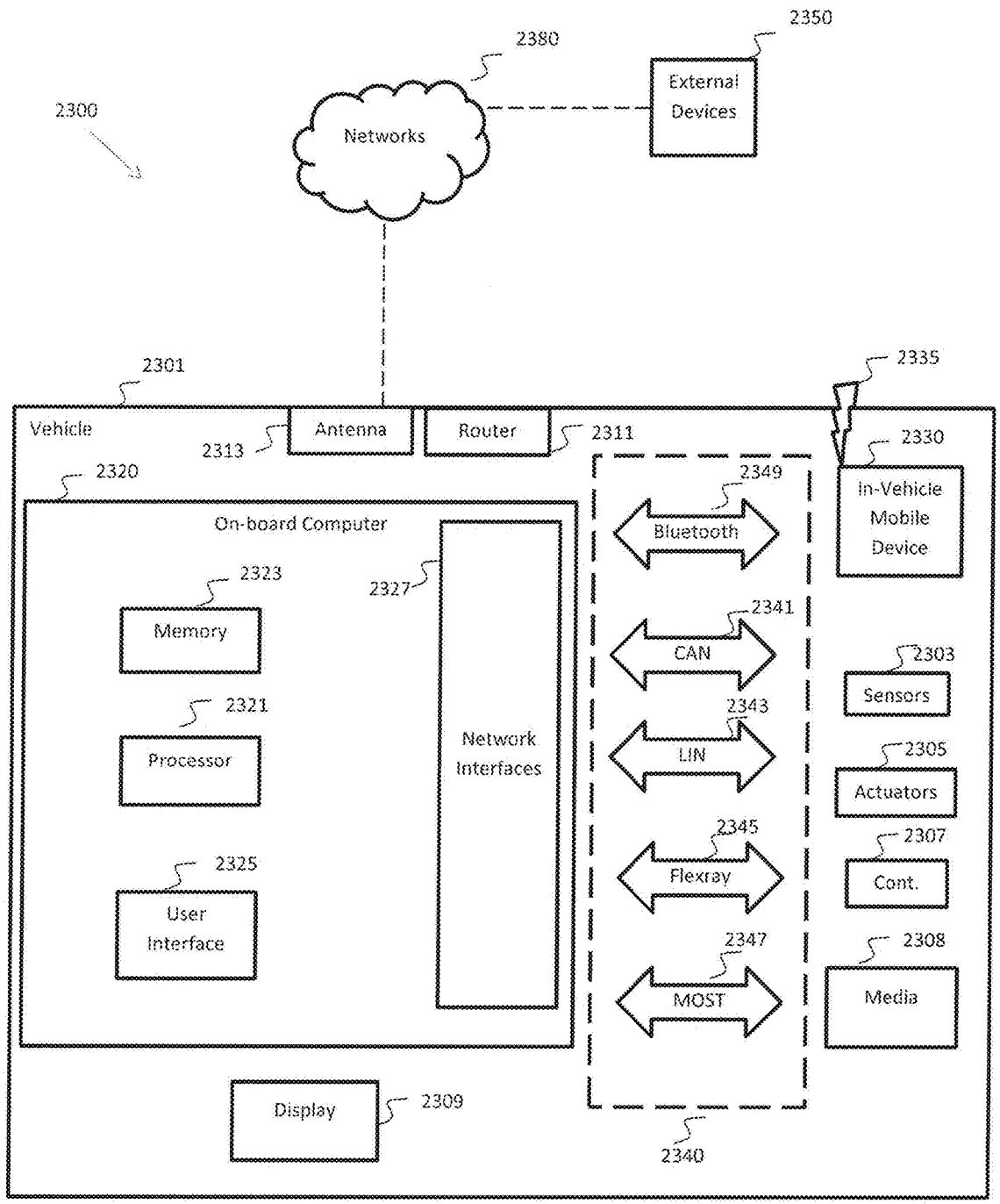
FIG. 23 is a simplified block diagram of a vehicle environment in which embodiments of the invention disclosed herein may be implemented.

FIG. 23 is a simplified block diagram of a vehicle environment in which embodiments of the invention disclosed herein may be implemented. The vehicle environment 2300 includes a vehicle 2301 in communication with one or more external devices 2350 by way of one or more external networks 2380. Vehicle 2301 also includes various internal networks 2340 for interconnecting several vehicle devices within the vehicle as will be discussed below. The vehicle environment 2300 may also include one or more in-vehicle mobile device 2330. External devices 2350 include any device located outside the vehicle 2301 such that the external device must communicate with the vehicle and its devices by an external network 2380. For example, the external devices may include mobile devices, electronic devices in networked systems (e.g., servers or clients in a local area network (LAN), etc.), on board computers of other vehicles etc. In-vehicle mobile devices 2330 are devices which are located within, or in the vicinity of the vehicle 2301 such that the in-vehicle mobile device can communicate directly with internal networks 2340 of the vehicle 2301. In-vehicle mobile devices 2330 may also connect with external networks 2380 as discussed below.

Vehicle 2301 includes vehicle devices integral with or otherwise associated with the vehicle 2301. In the embodiment of FIG. 3, vehicle devices include one or more sensors 2303, one or more actuators 2305, one or more control units 2307, one or more media systems 2308, one or more displays 2309, one or more routers 2311, one or more antenna 2313, and one or more on board computers 2320. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation syste e.g., GPS) displays, other peripheral or auxiliary devices or components associated with the vehicle 2301.

Sensors 2303 detect various conditions within (or in the immediate vicinity of) the vehicle 2301. For example, sensors 2303 may be temperature sensors, photosensors, position sensors, speed sensors, angle sensors or any other sensor for detecting a diagnostic condition or other parameter of the vehicle 2301 or its ambient environment. Sensors 2303 may be passive or "dumb" sensors that provide an analog representative of the sensed parameter, or so called "smart" sensors with integrated memory and digital processing capability to analyze the parameter sensed within the sensor itself. Actuators 2305 cause motion of some mechanical element of the vehicle in response to a control signal. For example, actuators 2305 may be hydraulic actuators, pneumatic actuators or electrical/electronic actuators such as a stepper motor. Actuators 2305 may be used to move vehicle lighting devices to implement intelligent light, for example.

Actuators 2305 may also be "dumb" devices that react to a simple analog voltage input, or "smart" devices with built-in memory and processing capability. Actuators 2305 may be activated based on a sensed parameter from sensors 2303, and one such sensed parameter may be a physical position of the actuator 2303 itself. Thus, the sensors 2303 and actuators 2305 may be connected in a feedback control loop for diagnostic detection and control of the vehicle 2301.

Control units 2307 include any embedded system,processor, electronic control unit (ECU) or microcontroller. Control unit 2307 may be dedicated to a specific region or function of the vehicle 2301. For example, control unit 2307 can provide memory and control logic functions for several dumb devices, such as passive sensors 2303 and actuators 2305. In one embodiment, control unit 2307 is an ECU dedicated for controlling one or more lighting devices according to embodiments disclosed herein. Typically, numerous ECUs, with different embedded software, may be found in a single automobile and may communicate via internal networks as discussed below.

On-board computer 2320 is a vehicle device for providing general purpose computing functionality within the vehicle 2301. The on-board computer 2320 typically handles computationally intensive functions based on software applications or "apps" loaded into memory. On-board computer 2320 may also provide a common interface for different communication networks in the vehicle environment 2300. On-board computer 2320 includes one or more processor 2321, one or more memory 2323, one or more user interface 2325, and one or more network interface 2327. One or more display 2309 and one or more router 2311 may be an integral part of the on board computer 2310, or distributed in the vehicle and associated with the on-board computer and other vehicle devices. Separate displays 2309 may be provided in suitable locations for access by a driver and passengers in the vehicle 2301.

On-board computer 2320, and other associated or integrated components such as vehicle devices can include one or more memory element 236 for storing information to be used in achieving operations associated with control of fiber optic light panels as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 2300 could be provided in any database, register, table, cache, queue, control list, or storage structure, based on particular needs and implementations, all of which could be referenced in any suitable timeframe.

In example embodiments, the operations for controlling fiber optic light devices may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 2323) can store data used for the operations described herein. This includes the memory elements being able to store software, logic, code, or processor instructions that are executed to carry out the activities described in this Specification.

Processor 2321 can execute software or algorithms to perform activities to enable control of lighting devices disclosed herein. A processor 2321 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 23 may be communicatively coupled to one another by one or more suitable communications medium (wired, wireless, optical) that provides a pathway for electronic communications. Any element in FIG. 23 may act as a network node in communication with any other element of FIG. 23 also acting as a network node. Any suitable network messaging protocol, network topology or network geographic scope may be included in the vehicle environment 2300. Thus, embodiments of on-board computer 10 may include one or more distinct interfaces, represented by network interfaces 2327, to facilitate communication via the various networks (including both internal and external networks) described herein. Such network interfaces 2327 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 2300 can also include suitable interfaces for receiving, transmitting, and/or otherwise communicating data or information in the vehicle environme 2300.

Multiple internal vehicle networks represented by 2340 may exist in the vehicle 2301 to provide communication pathways to various vehicle devices distributed throughout the vehicle 2301. An internal vehicle network 2340 is a collection of nodes, such as vehicle devices, integrated with or otherwise linked to the vehicle and interconnected by communication means. Vehicle networks 2340 typically include hard wired bus type networks, each providing communication pathways to particular vehicle devices distributed throughout a vehicle. FIG. 23 shows four examples of such hard wired networks: Controller Area Network (CAN) 2341, Local Internet Network (LIN) 2343, Flexray bus 2345, and Media Oriented System Transport (MOST) network 2347.

CAN bus 2341 uses a message based protocol, designed for and typically used by automotive applications. The CAN bus 2341 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 2341 may connect a transmission sensor and an energy sensor to a main engine controller, and a different CAN bus may connect the main engine controller and a main body controller to on-board computer 2320. LIN network 2343, may be used to sense external conditions such as light, or to control small mechanisms such as door locking systems. For example, LIN bus 2343 may connect a driver's seat actuator, temperature controls, and windshield wiper actuators to a main body controller of a CAN bus.

Flexray bus 2345 is typically a dedicated network for hard real-time controllers, used for drive-by-wire and/or brake-by-wire applications in which information from the engine and/or wheels of the vehicle 2301 is collected and transmitted to appropriate applications and/or data repositories. For example, Flexray bus 2345 may connect a chassis module of the vehicle 2301 to on-board computer 2320 through an appropriate interface, and/or may connect brakes and electronic stability control (ESB) to the chassis module attached to Flexray 2345, MOST network 2347 can also be found in vehicles for transmitting audio, video, and voice on fiber optics. MOST buses 2347 can connect media system 2308, to on-board computer 2320 through appropriate interfaces, and/or connect a reversing camera and a navigation system n intermediate device which is connected to computer by MOST bus 2347.

Other hard wired internal networks such as Ethernet may be used to interconnect vehicle devices in the vehicle. Further, internal wireless networks 2349, such as near field communications, Bluetooth etc may interconnect vehicle devices.

External networks 238 may be accessed from vehicle 2301 by vehicle devices and in-vehicle mobile devices 2330 when a communication link is available. In-vehicle mobile devices 2330 include mobile phones, smart mobile phones smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 2300. Data, may be any type of numeric, voice, video, or script data, or any type of source or object code, or any other suitable information in any appropriate format that may be communicated from one point to another in electronic devices and/or networks. A vehicle router 2311 may also be used to access external network infrastructure within range of the antenna 2313 of vehicle 2301.

Some form of wireless communication is needed to achieve external network connectivity from vehicle 2301. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 2300 via some network, and such communication may be initiated through any suitable device such as, in-vehicle mobile device 2330, display 2309, user interface 2325, or external devices 2350.

In-vehicle mobile devices 2330, and mobile devices external to vehicle 2301, may communicate with on-board computer 2320 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 232 through a USB cable or wireless network when, for example, the external mobile device is a diagnostic tool used by a mechanic for servicing vehicle 10.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims. In particular, one skilled in the art will understand that the invention disclosed herein can be applied to meet could be applied in accordance with Federal Motor Vehicle Safety Standards (FMVSS) No. 108, as well as corresponding regulations in Europe, Japan, China and other parts of the world.

The invention claimed is:

1. A lighting device for a vehicle, comprising:
a first light source configured to generate first light;
a second light source configured to generate second light; and
a fiber optic light panel comprising a plurality of optical fibers, each of the optical fibers being optically coupled to one or both of the first and second light sources, the plurality of optical fibers being arranged to define an illumination region on the light panel, each of the optical fibers configured to emit light transversely within the illumination region such that one or both of the first and second light is output from the illumination region in a spatially-varying light distribution.

2. The lighting device of claim 1, wherein said first and second light sources are optically coupled to opposing ends of each of the plurality of optical fibers.

3. The lighting device of claim 2, wherein the first and second light sources are configured to generate the first light that is the same as the second light.

4. The lighting device of claim 2, wherein the first and second light sources are configured to generate the first light that is different from the second light.

5. The lighting device of claim 1, wherein the plurality of optical fibers are positioned adjacently one to another in a same plane and coupled said first and second light sources.

6. The lighting device of claim 5, wherein adjacent ones of the plurality of optical fibers are coupled alternatingly to the first and second light sources.

7. The lighting device of claim 5, wherein of the plurality of optical fibers comprise multiple groups of adjacently arranged fibers, and said multiple groups are coupled alternatingly to the first and second light sources.

8. The lighting device of claim 1, wherein said plurality of optical fibers are provided in respective sub-panels arranged side-by-side to form said panel.

9. The lighting device of claim 1, wherein said plurality of optical fibers are provided in respective sub-panels arranged to at least partially overlap one another.

10. The lighting device of claim 1, wherein the plurality of optical fibers each receive light from a same side of the illumination region such that the first and second lights travel in a same direction in said illumination region.

11. The lighting device of claim 1, further comprising a controller configured to control the first and second light sources to achieve different light output characteristics from the panel.

12. The lighting device of claim 11, wherein said controller is configured to control said first and second light sources to achieve at least one of spatial effects and dynamic effects of light output in the illumination region.

13. The lighting device of claim 1, wherein each of the optical fibers have light-scattering objects to emit light transversely along the length thereof, the light-scattering objects having a varying spatial distribution within the optical fibers.

14. The lighting device of claim 1 further comprising:
an optical reflective portion provided on a first side of the optical fibers in the illumination region; and
a light transmission portion provided on a second side of the optical fibers in the illumination region which is opposite to the first side, wherein at least one of the optical reflective portion and transmission portion is configured to produce light emitted from said illumination region in the spatially-varying light distribution.

15. A method for operating a fiber optic light panel, the method comprising:
coupling first light to at least one of a plurality of optical fibers of the panel, the plurality of optical fibers being arranged to define an illumination region on the panel;
coupling second light to at least another of the optical fibers of the panel, each of the optical fibers being configured to emit light transversely within the illumination region such that one or both of the first and second light is output from the illumination region in a spatially-varying light distribution; and
controlling timing of said coupling of the first and second light to provide different light output characteristics from said illumination region for different automotive lighting functions.

16. The method of claim 15, wherein said different light output characteristics comprise different colors suitable for the different automotive lighting functions.

17. The method of claim 15, wherein said different light output characteristics comprise different brightness outputs suitable for the different automotive lighting functions.

18. The method of claim 15, wherein said controlling comprises controlling timing of said coupling of the first and second light to provide dynamic lighting effects from said panel.

19. A fiber optic lighting panel comprising:
a fiber portion including a plurality of optical fibers each configured to emit light along a respective length of the optical fiber, and the plurality of optical fibers are arranged to define an illumination region of the panel;
an optical reflective portion provided on a first side of the fiber portion; and
a light transmission portion provided on a second side of the fiber portion which is opposite to said first side, wherein at least one of the fiber portion, optical reflective portion and transmission portion is configured to produce light emitted from said light emitting region in a spatially-varying light distribution.

20. The fiber optic lighting panel of claim 19 wherein at least one of the fiber portion, optical reflective portion and transmission portion has a physical property which is changed over an area of the light emitting region.

* * * * *